United States Patent [19]

Wolfseder

[11] Patent Number: 4,522,257

[45] Date of Patent: Jun. 11, 1985

[54] TUB VAPOR CONDENSER

[75] Inventor: Alfons Wolfseder, Freising, Fed. Rep. of Germany

[73] Assignee: Anton Steinecker Maschinenfabrik GmbH, Freising, Fed. Rep. of Germany

[21] Appl. No.: 468,162

[22] Filed: Feb. 22, 1983

[30] Foreign Application Priority Data

Apr. 16, 1982 [DE] Fed. Rep. of Germany ....... 3214065

[51] Int. Cl.³ .............................................. F28B 3/04
[52] U.S. Cl. .................................... 165/113; 165/111; 261/148; 261/155
[58] Field of Search ...................... 165/110, 111, 113; 261/94, 155, 147, 148

[56] References Cited

U.S. PATENT DOCUMENTS

| Re. 23,245 | 7/1950 | Atkeson | 165/113 X |
| 2,570,247 | 10/1951 | Kals | 165/111 X |
| 2,756,028 | 7/1956 | Byerly | 165/113 X |
| 3,768,234 | 10/1973 | Hardison | 261/94 X |

FOREIGN PATENT DOCUMENTS 459653  2/1973  U.S.S.R. ............................. 261/155

Primary Examiner—William R. Cline
Assistant Examiner—Peggy A. Neils
Attorney, Agent, or Firm—Learman & McCulloch

[57] ABSTRACT

In a tub vapor condenser for brewing tubs two condenser stages are arranged above one another in the vapor vent of the tub, the lower condenser stage being constructed as a tube condenser and the upper condenser stage being constructed as a spray arrangement for water and other materials, so that on the one hand it is possible to obtain clean usable water at a high temperature and on the other hand odor-generating substances are largely eliminated from the vapor.

13 Claims, 2 Drawing Figures

TUB VAPOR CONDENSER

BACKGROUND OF THE INVENTION

The invention relates to a tub vapour condenser for mash and/or wort tubs.

For the recovery of the heat energy contained in the vapour from mash and wort tubs it is known to arrange a condenser in the vapour vent pipe so that water in the condenser may be heated. Essentially there are two known constructions for achieving this result. In one known construction a tube condenser is used which is supplied with cold water and on the outer wall of which the hot vapour condenses thus heating the water. In the second known construction cold water is sprayed in fine dispersion into the vapour vent pipe so that the vapour is condensed.

The two known constructions, however, have different disadvantages. In the first construction it is a particular disadvantage that odor-generating substances contained in the vapour having a particularly low boiling point cannot be condensed without residue in the tube condenser. This applies particularly when a high usable water temperature is required. The second known construction wherein water is sprayed directly into the vapour vent pipe, on the other hand has the disadvantage that numerous undesirable condensate constituents pass into the usable water which cannot be used for all purposes without first being purified.

SUMMARY OF THE INVENTION

An object of the invention is to avoid the shortcomings of the known constructions and to provide a tub vapour condenser which is distinguished by almost quantitative elimination of odor-generating substances in the vapour, but which at the same time supplies usable water free from condensate impurities and at a high temperature, and which can be installed in a simple manner at a later stage in existing plant.

This object is achieved according to the invention in that two condenser stages with separate condensate extraction means are arranged above one another in communication with the vapour vent pipe of the tub, the lower condenser stage being constructed as a tube condenser and the upper condenser state being constructed as a spray device for spraying water and materials for binding odor-generating substances.

By the combination according to the invention of two different condenser stages arranged above one another in the path of vapourous gas rising through the vapour vent pipe the advantages of the known constructions are combined but their disadvantages are avoided. The tube condenser provided in the lower condenser stage makes it possible to obtain usable water at a high temperature which is not contaminated by condensate. The upper condenser, on the other hand, serves to eliminate those residual constituents of odor-generating substances in the vapour which have a particularly low boiling point and therefore do not reach condensation in the lower condenser stage. Since the condensate is extracted separately from the two condenser stages, differentiated use in possible depending upon the type of condenser contamination.

The construction according to the invention requires a particularly small amount of space and makes it possible for the two-stage tub vapour condenser to be retrofitted without difficulty at a later stage in existing plant and in this way make it considerably more economical.

DESCRIPTION OF THE DRAWINGS

Advantageous embodiments of the invention are disclosed in the following description and illustrated in the accompanying drawings, in which.

DETAILED DESCRIPTION

Figure 1:
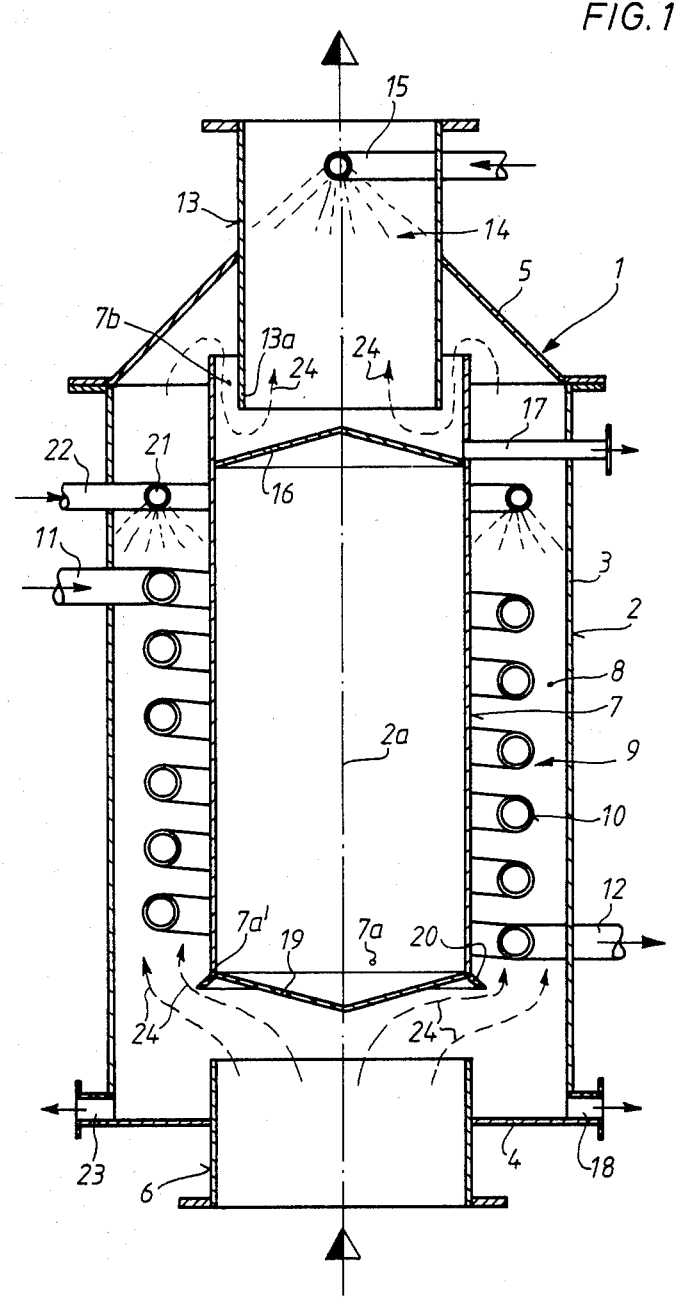
FIG. 1 is a vertical sectional view of a first embodiment of the tub vapour condenser.

In the first embodiment shown in FIG. 1 the tub vapour condenser 1 has an outer housing 2 which is arranged approximately upright and essentially comprises a cylindrical peripheral wall 3, an approximately horizontal flat bottom 4, and a cover 5 which converges upwards approximately in the shape of a funnel or a truncated cone. Gases containing vapour rise from a mash and/or wort tub (not shown) through a vapour vent pipe 6 that projects from below (and sealingly through the base 4) into the interior of the housing 2. This vapour vent pipe 6 ends in the interior of the housing 2 spaced axially from the lower end 7a of a cylindrical displacement body 7 which is arranged coaxially in the housing 2 (cf. longitudinal axis 2a of the housing), is arranged upright in the housing 2, and extends over the greater part of the height of the cylindrical peripheral wall 3 and beyond the upper end of the latter. In this way an annular chamber 8 is constructed in the housing 2 between the peripheral wall 3 thereof and the displacement body 7.

Inside the annular chamber 8 is provided a lower condenser stage 9 comprising essentially a helical pipe 10 which is arranged coaxially with the axis of the vapour vent pipe 6 and thus coaxially with the condenser housing 2. This helical pipe 10 forms a cylindrical coil over its height and surrounds the displacement body with radial spacing therefrom. At the upper end the pipe 10 has a cold water inlet 11, while at its lower end a hot water outlet 12 is provided; both the inlet 11 and the outlet 12 are constructed in the form of pipe connections.

A second vapour vent tube 13 of smaller diameter than the body 7 extends coaxially with longitudinal axis 2a of the housing and projects downwardly through the cover 5 into the housing 2. A second, upper condenser stage 14 comprising a nozzle arrangement for spraying a fine dispersion of water and known materials for binding odor-generating substances delivered via a supply line 15, is arranged in the second vapour vent tube 13. As is indicated in FIG. 1, the water and the binding materials can be sprayed over the whole cross-section of this second vapour vent tube 13.

The lower end 13a of the second vapour vent tube 13 projects into and is radially spaced from the upper end 7b of the displacement body 7 to form a passage necessitating deflection of air passing from the chamber 8 into the tube 13. The upper condenser stage 14 has a smaller diameter than the lower condenser stage 9.

A short distance below the air deflection zone, that is to say in the region of its upper end 7b, the displacement body 7 is closed by an upper cover part in the form of a relatively flat conical dome 16 that confronts but is spaced from the lower end of the tube 13. This conical dome 16 not only favors the aforesaid air deflection but forms a recess that enables condensate from the upper condenser stage 14 to run toward the peripheral edge of the dome 16 so that it can be collected and extracted via a tubular condensate extraction pipe 17 that extends through the upper end 7b of the body 7. For the lower condenser stage 9, on the other hand, a separate condensate discharge pipe is provided directly on the base 4 of the housing 2 in the form of a pipe connection 18.

The displacement body 7 is also closed at its lower end 7a by a lower cover part 19 which in this case is constructed in the form of an inverted shallow cone (apex downwards) 19 and is mounted directly on the lower end edge 7a' in confronting spaced relation to the pipe 6. A condensate drip rim 20 which extends outwards of the cover 19 at an angle is also provided on the outer periphery of this lower end edge 7a', and such drip rim prevents condensate from dripping into the first vapour vent pipe 6 which is located below it and has a diameter corresponding to that of the displacement body 7.

Since it is also possible for the tube condenser pipe 10 of the lower condenser stage 9 to be freed from any impurities left adhering to the pipe, an annular spray line 21 for purifying fluid is arranged in the annular chamber 8 above the helical pipe 10. The spray line 21 has an outwardly directed pipe connection 22. On the base 4 of the housing 2 a further discharge connection 23, in addition to the pipe connection 18, can be provided for used purifying fluid.

The installation of the tub vapour condenser 1 described above in communication with a vapour vent pipe of a brewing tub and the function of such condenser should be readily understood. To facilitate understanding broken arrows 24 have been drawn in to indicate the direction of flow of the vapour or exhaust gas through the tub vapour condenser 1.

Figure 2:
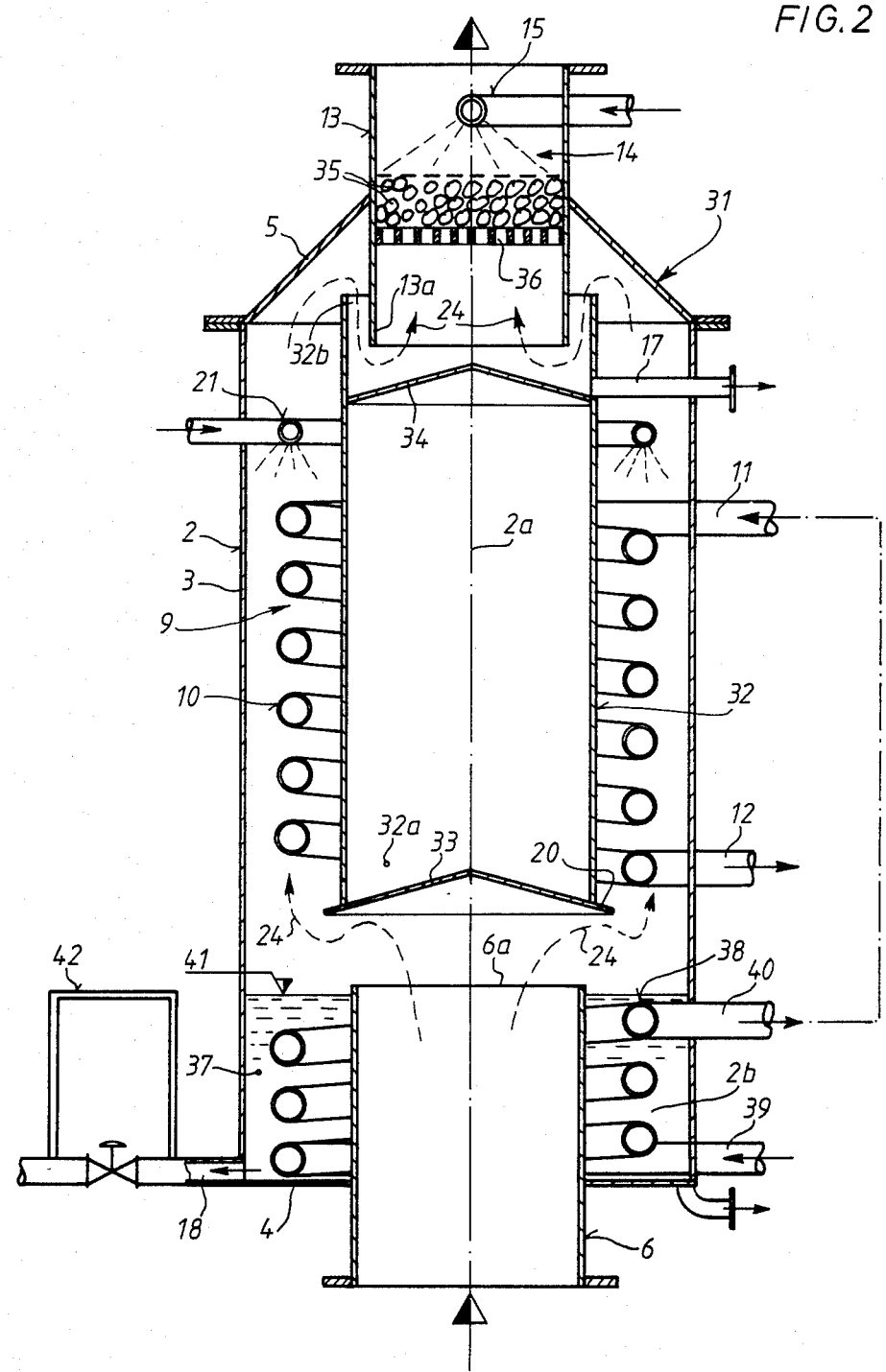
FIG. 2 is a vertical sectional view through a second embodiment in which a condensate collecting chamber with an additional heat exchanger is constructed in the lower end.

A second embodiment of the tub vapour condenser according to the invention is described below with reference to FIG. 2, and for the sake of simplicity elements in FIG. 2 which are essentially similar in construction and arrangement to those in FIG. 1 are designated by the same reference numerals so that a further detailed description thereof is superfluous.

The second embodiment of the tub vapour condenser is designated generally by the reference to character 31 and has a housing 2 which is of essentially similar construction to that of the first embodiment and has a cylindrical peripheral wall 3, a level base 4, and an upwardly tapering cover 5. A cylindrical displacement body 32, which can be constructed to a large extent in the same way as the displacement body 7 in FIG. 1, is arranged coaxially in the interior of the housing of the condenser 31. The lower end 32a of the body 32 has a lower cone 33 forming a closure which in this case has its apex directed towards the interior, that is to say upwards. The conical dome 34 (upper cover part) of the displacement body 32, on the other hand, is recessed somewhat, as in the first embodiment, relative to the extreme upper end 32b of the displacement body 32 so that here too the lower end 13a of the upper vapour vent tube 13 can project inwards with radial spacing and cause gas to be deflected. Here too this upper vapour vent pipe 13 contains the upper condenser stage 14, that is to say the upper vapour vent pipe 13 to a certain extent forms the housing for the upper condenser stage 14.

At the upper end the upper condenser stage 14 is also provided a supply line 15 for spraying water and materials for binding odor-generating substances. In addition the upper condenser stage 14 can contain filling material 35 which serves to increase the surface area. Such filling material may comprise, for example, Raschig rings and is provided in a sufficiently thick layer. This filling material 35 is arranged at a distance below the supply line 15 and advantageously supported on a lower grating 36 which permits good flow; it can also be advantageous to arrange a grating, wire grid, or the like on the upper surface of the layer of filling material so that the layer of filling material is reliably held in position. In this way the layer of filling material can form a vapour cleanser in which the water sprayed in above it serves at the same time as a cleansing fluid. Condensate and cleaning fluid from this upper condenser stage 14 are collected immediately above the conical dome 34 and extracted via an upper condensate extraction pipe 17 constructed as a pipe connection.

The lower condenser stage 9 also contains, as in the FIG. 1 embodiment, at least one helical condensing pipe 10 with an upper cold water inlet connection 11 and a lower hot water outlet connection 12 arranged coaxially around the displacement body 32.

The lower vapour vent pipe 6 projects coaxially from below into the interior of the housing and ends at a distance from the lower end 32a of the displacement body 32. This pipe 6 can be of somewhat longer length than the pipe 6 of FIG. 1, but is otherwise of the same construction. In addition, the lower vent pipe connection 6, because of the construction of the lower end 32a of the displacement body 32 with the upwardly tapered cone 33, can have a somewhat smaller diameter than the displacement body 32. In this case, however, an annular condensate collecting chamber 37 in which a heat exchanger 38 is arranged is constructed in the lower part 2b of the outer condenser housing 2 between the peripheral housing wall 3 and the vapour vent pipe 6. The heat exchanger 38 can generally be in any suitable form. A particularly advantageous construction, however, corresponds essentially to the construction of the helical pipe 10, that is to say the heat exchanger 38 also essentially comprises a helical pipe with a lower cold water supply pipe 39 and an upper water discharge pipe 40. It is then particularly advantageous if the upper water discharge pipe 40 is directly connected by a pipe to the upper cold water inlet 11 of the helical pipe 10 of the lower heat exchanger stage 9, as indicated by the chain line in FIG. 2. In this way the residual heat content of the condensate collecting in the collecting chamber 37 can to some extent be utilized for preheating the cold water to be supplied to the lower condensate stage 9. In order to achieve the best possible heat exchange here an arrangement is advantageously provided in the condensate collecting chamber 37 with the aid of which the condensate located in the collecting chamber can be kept and regulated at a level 41 which lies somewhat below the upper edge 6a of the vapour vent pipe 6 inside the housing. The height of the heat exchanger 38 is also approximately at the level 41. The aforesaid regulating arrangement can be formed by known means, for example by a known filling level measuring and regulating arrangement or, as indicated in FIG. 2, by a siphon pipe 42 connected to the lower condensate connection 18 (in the region of the base 4).

As regards the other parts of this tub vapour condenser 31, it also may include the annular spray nozzle line 21 for cleansing fluid above the pipe 10 which has been described in the first embodiment.

The flow path of the tub vapour through the condenser 31 is also indicated by broken arrows 24.

In both embodiments the outer housing of the tub vapour condenser can at the same time in practice form a corresponding part of the vapor vent pipe for a mash and/or wort tub, so that this tub vapour condenser can be installed without significant loss of space.

Finally, it should also be mentioned that the lower condenser stage, depending upon the desired capacity, can of course contain more than only one helical pipe.

I claim:

1. A two stage condenser for use with vapor gas rising from a mash or wort tub, said condenser comprising an upright hollow housing having a side wall, a bottom, and a cover; a hollow body within said housing having a peripheral wall and bottom wall; a vent pipe sealingly extending through the bottom of said housing, said peripheral wall of said body and said side wall of said housing defining an annular chamber therebetween in communication with said vent pipe; a vent tube sealingly extending through said cover and projecting into said hollow body from the upper end thereof, the cross-sectional dimension of said vent tube being smaller than that of said peripheral wall to define therebetween an annular passage in communication with said annular chamber; a deflector within said body adjacent said vent tube for deflecting into the latter gas from said annular chamber; cooling means within said annular chamber for cooling said gas and condensing vapour therefrom; means for spraying a liquid into said vent tube and onto said deflector; first extraction means for extracting liquid collected on said deflector; and second extraction means independent of said first extraction means for extracting condensate from said annular housing.

2. The construction according to claim 1 including annular heat exchange means within said housing adjacent the bottom thereof.

3. The construction according to claim 2 wherein said cooling means comprises a pipe having an inlet and an outlet and including means coupling said heat exchange means to said inlet.

4. The construction according to claim 1 wherein said bottom wall extends beyond said peripheral wall to form a drip rim at the lower end thereof.

5. The construction according to claim 4 including means for regulating the level of condensate collected in said housing.

6. The construction according to claim 1 wherein said cooling means comprises a tubular member having an inlet at one end for introducing cooling fluid to said member and an outlet at its opposite end for discharging said cooling fluid from said member.

7. The construction according to claim 6 wherein said inlet is adjacent the upper end of said chamber.

8. The construction according to claim 1 wherein said liquid includes material for binding odor-generating substances.

9. The construction according to claim 1 wherein said vent tube contains filling material to increase its surface area.

10. The construction according to claim 9 including a grating in said vent tube for supporting said filling material.

11. The construction according to claim 9 wherein said filling material is arranged in a layer and forms a gas cleanser.

12. The construction according to claim 1 wherein said cooling means comprises a helical pipe.

13. The construction according to claim 1 including a drip rim carried by said inner wall overlying and extending outwardly beyond said vent pipe.

* * * * *